March 19, 1935.  C. C. CALKINS  1,994,942
VEHICLE ROCKING MACHINE
Filed Oct. 18, 1932    2 Sheets-Sheet 2
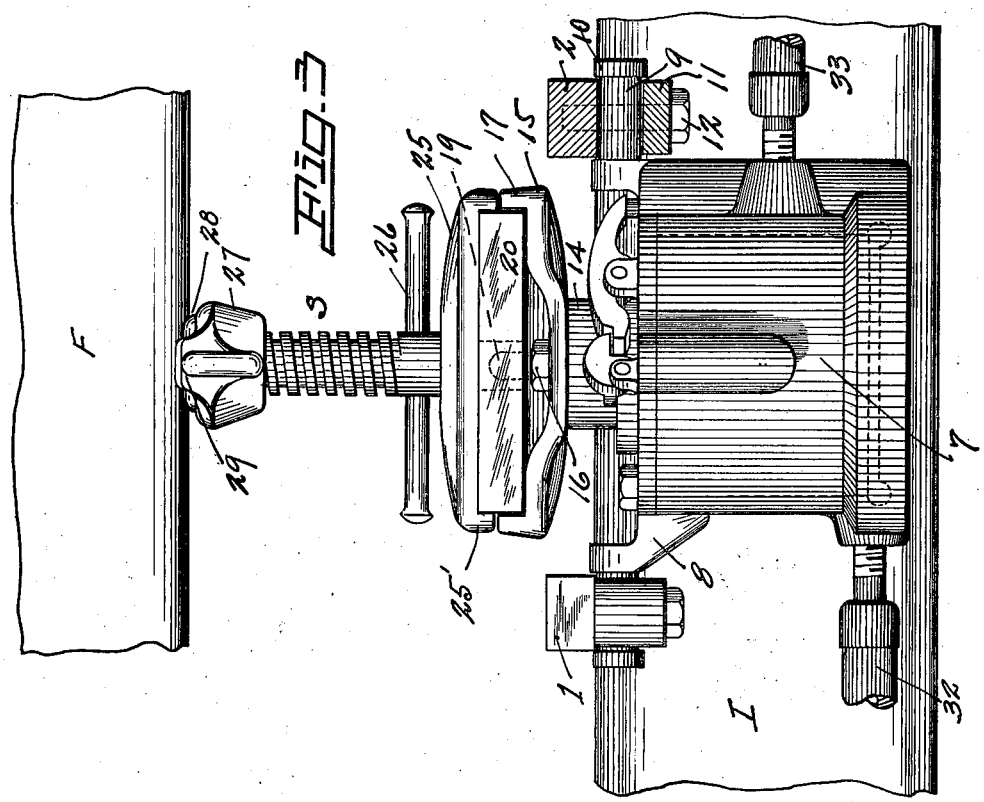
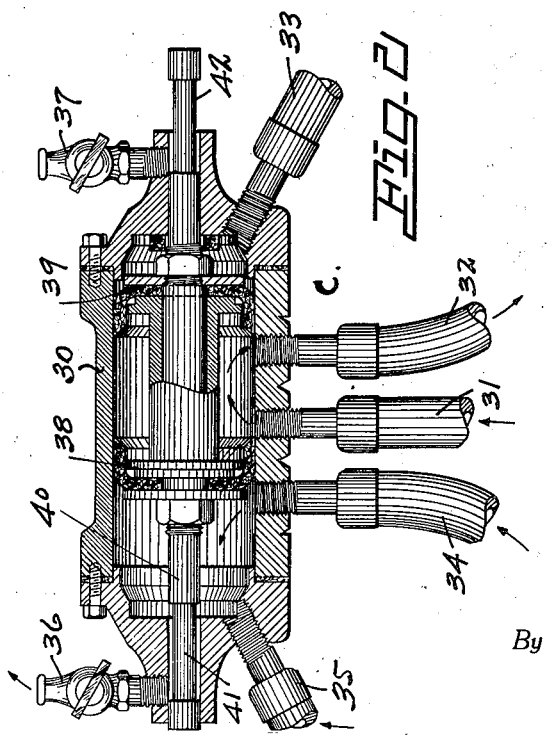
Claude C. Calkins
Inventor
By Herbert E. Smith
Attorney Patented Mar. 19, 1935

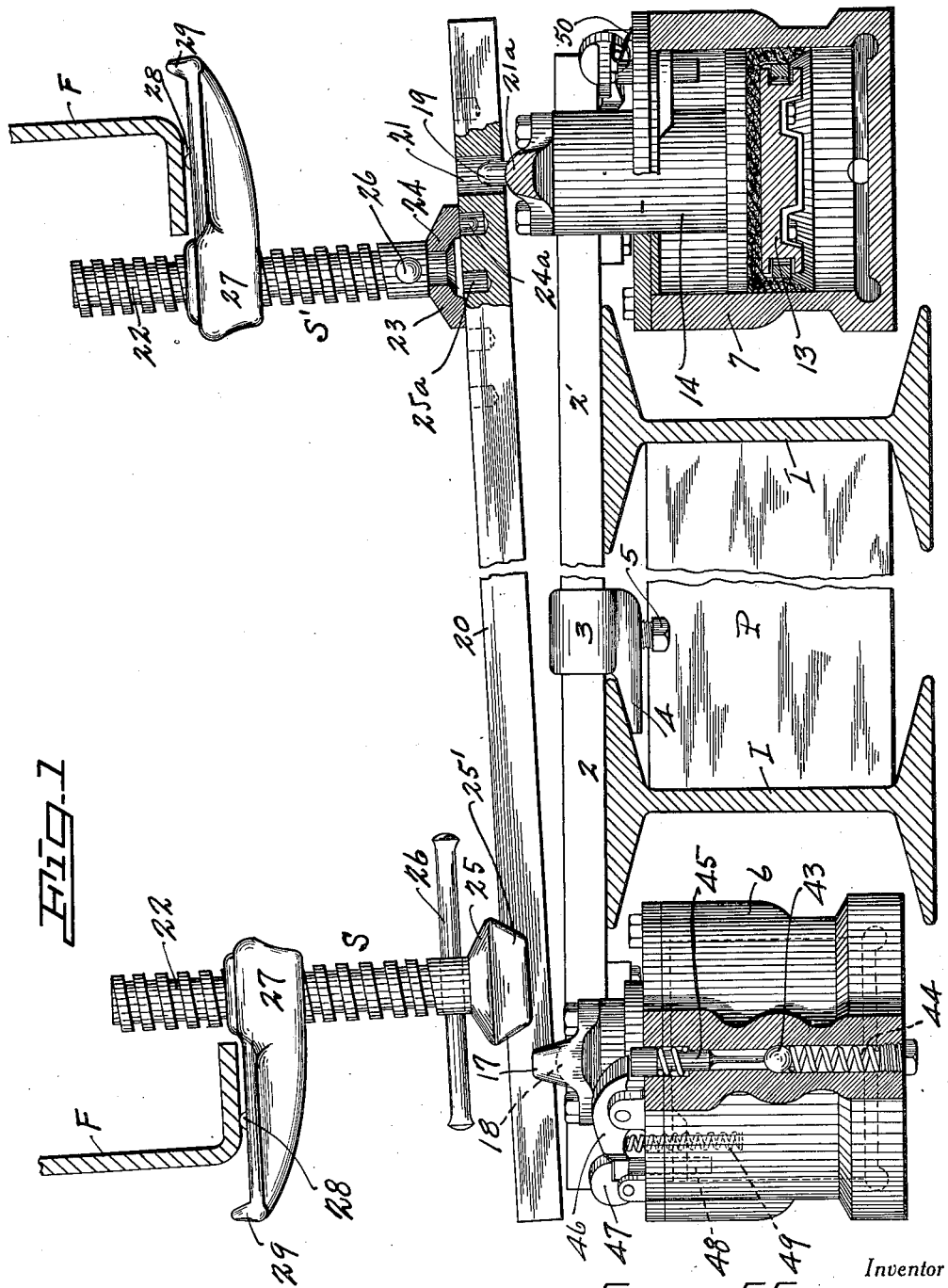

1,994,942

UNITED STATES PATENT OFFICE 1,994,942

VEHICLE ROCKING MACHINE

Claude C. Calkins, Spokane, Wash.

Application October 18, 1932, Serial No. 638,337

6 Claims. (Cl. 73—51)

My present invention relates to an improved vehicle rocking-machine adapted for use with automotive vehicles while the latter are being greased or lubricated. According to the usual and well known custom of greasing cars or automotive vehicles at service stations and other places, the car stands with its wheels upon the runways of an elevated support, or upon the floor above a pit, in order that the attendant may have access to the parts to be lubricated. If the car is to be rocked for detection, by sound of squeaks or other noises, in the joints of the frame, body, and other parts of the car, the practice of pushing and pulling on the body is resorted to for causing a swaying motion in order to produce these noises in the joints and connections. This is a cumbersome operation, and when the swaying motion is produced by hand, the operation requires the time and laborious effort of at least one man.

By the employment of the rocking machine of my invention, the car is automatically and mechanically swayed or rocked laterally for the purpose of loosening joints that have become "frozen" by coagulated grease or oil, and to detect, by sound, the location of squeaking joints that require greasing or lubricating.

In carrying out my invention I employ means located transversely of the car, under its frame, and approximately midway the length of the car, whereby opposite sides of the car are alternately lifted, slightly, and lowered, to cause the swaying of the body and the frame, and for imparting this lifting movement I employ a pair of spaced, pneumatic motors or jacks, under control of an automatically operating valve-device receiving compressed air, or other suitable motive fluid, from a source of supply. Thus, the car to be greased is placed in the customary position, the rocking-machine is adjusted for use, power is supplied to the control valve-device, and the swaying motion is imparted to the car while the operation of applying grease or lubricant at the proper places is carried out.

The invention consists in certain novel combinations and arrangements of parts as will hereinafter be more fully pointed out. In the accompanying drawings I have illustrated one complete example of the physical embodiment of my invention wherein the parts are combined and arranged according to one mode I have thus far devised for the practical application of the principles of my invention. It will be understood that changes and alterations may be made in the exemplified structure, within the scope of my claims, without departing from the principles of the invention.

Figure 1 is a view with parts in elevation and parts in section, showing the rocking machine supporting the side bars of a car-frame, and with the frame slightly tilted by the rocking beam, one end of which is slightly elevated, with the fulcrum point of the beam near its lower end.

Figure 2 is a longitudinal sectional view of the automatically operating, pneumatic valve-device, that controls the working strokes of the spaced motors so that they operate alternately.

Figure 3 is a view in elevation, and partly in section, showing the machine as viewed from the right side in Figure 1.

In order that the general arrangement and utility of the machine may readily be understood I have indicated the two spaced channel side-bars F, F, of the car frame or chassis, and a portion of the elevator or hoist which lifts the car, bodily, for inspection and greasing, as I, I, and these I-beams are joined by plates P to provide a rigid supporting structure for the car.

As a supporting means for the two motors I provide a pair of suspending bars 1 and 2, which are laid across and supported on the top flanges of the I-beams of the elevator, or elevated frame, and the two bars, which extend transversely of the car, are rigidly fastened to the I-beams, each by a pair of slides 3 having lips 4 to engage under the upper flange of the I-beam, and a set bolt 5 to secure the slide in adjusted position on the bar. One slide is shown in Figure 1, but it will be understood that each cross bar has at least a pair of slides, one to engage each I-beam, and hold the cross bars against movement on the I-beams.

A pneumatic jack, or other motive fluid motor, as 6 and 7, is suspended from the opposite pairs of ends of the bars, outside of the supporting frame I—P, and each motor is fashioned with diametrically arranged bracket arms 8, fashioned with integral trunnions 9, and the trunnions each has an enlarged head 10 at its free end. A U-shaped bearing block 11 is provided for each trunnion and bolted at 12 to the under side of a suspending bar or cross bar, as 1 and 2, and as indicated in Figure 3, the lower end of the motor may swing, slightly, toward and away from the observer.

Within the vertically arranged motor casings vertically reciprocable pistons 13 are located, and provided with upper stems 14, and at the upper, exterior end of each stem a saddle 15 is mounted and secured by a bolt 16. These saddles which extend lengthwise of the car, are fashioned with upturned lugs 17, and one of the saddles is fashioned with a central boss or fulcrum lug 18, while the other saddle is fashioned with a central pin 19.

The pin 19 is designed for a loose coupling with the rocking beam 20 that is provided with a vertical hole 21 to receive the pin, and this end of the beam rests on a fulcrum lug 21a while the other end of the beam rests upon the fulcrum lug 18 of the other saddle.

As seen in Figure 3 the rocking beam 20 is a flat, steel bar located above and between the two cross bars or suspending bars 1 and 2, and this beam extends transversely of the car. The beam has a length greater than the width of the car frame, and therefore the machine is mounted in operative position after the car has been placed in position for greasing, and of course the machine is dismounted, after greasing, before the car is run off the supporting structure.

Above the rocking beam are supported two screw jacks S and S' of the manually operated type and they are interposed between the lower faces of the side bars F, F of the car frame, and the top face of the rocking beam. Each screw jack comprises a screw bar 22, having a journal bearing 23 in a foot plate 24, or 25, and these plates have end retaining lugs or flanges 25' to fit over the opposite side edges of the rocking beam. A hand bar 26 is passed through a hole in the screw bar for turning the bar in a stirrup 27 and the latter has a cross bead 28 on its upper face that contacts against the lower face of the side bar F to aid in the rocking motion of the frame when the motors are operating, and retaining lugs 29 are fashioned at the free ends of these stirrups to prevent displacement of the jacks.

The two screw jacks are adjustable on the rocking beam to adapt them for use with frames of varying width, and at least one of the screw jacks is provided with retaining means to hold the jack and beam against relative movement. Thus, in Figure 1 the jack-plate 24 is provided with a pin 24a that may be fitted into a selected one of the sockets 25a arranged in a longitudinally extending series in the top face of the rocking member or beam 20, and this jointed connection insures safety in the relative arrangement of the jacks and beam, and permits adjustment of the jack 24 longitudinally of the beam.

After the machine has been placed in position on the I-beams beneath the frame F F of the car, and the screw jacks S and S' have been operated to elevate the stirrups 27 to lifting position beneath the frame, then by further turning of the screw bars the weight of the car is lifted, slightly, from the four wheels, by taking the weight off the springs of the car. Thus the weight of the car is supported by the machine at the center of the car, and the car body and frame may be rocked or swayed without disturbing the wheels and running gear of the car, by the action of the two pneumatic, or motive fluid, motors 6 and 7, which alternately lift and lower the ends of the beam 20 on the fulcrums 18 and 21a.

The alternate lifting movement of the motors is automatically performed under control of a pneumatic valve device C in Figure 2, which device is controlled by a suitable control valve, and operates continuously to supply air pressure to a motor, and then to cut off the air pressure thereto while supplying pressure to the other motor, and vice versa.

The valve device C comprises a usual air cylinder 30 which is supplied with air under pressure through the supply pipe or hose 31. A main hose 32 from the cylinder supplies air under pressure to the motor 7 and hose 33 from motor 7 returns air pressure to the cylinder. Main hose 34 from the cylinder supplies air under pressure to motor 6, and return hose 35 conveys air therefrom to the cylinder, the movement of air pressure in these hose being indicated in Figure 2 by the arrows.

Exhaust cocks 36 and 37 are arranged at opposite ends of the cylinder to vent the cylinder and reduce the pressure, alternately, at the outer ends of the double-piston valve 38, 39 which reciprocates longitudinally in the cylinder and controls the inlet and outlet ports of the hose 32 and 34.

The piston-valve is provided with a stem 40, and the stem, at its opposite ends is provided with reduced necks 41 and 42 that provide exhaust air spaces adapted to communicate with opposite ends of the cylinder 30, for venting the latter, through the vent cocks or drain cocks 36 and 37. The vent openings of these cocks may be adjusted to vary the volume of exhaust pressure through the ends of the cylinder, and they may readily be adjusted, by trial, until they insure smooth working of the two motors as they perform their functions of rocking the beam 20 to cause the side swaying of the car, and to insure smooth, automatic reciprocation of the double piston-valve 38—39.

In the circulation of air under pressure from the cylinder 30 the air flows through hose 32 to the motor 7, and lifts the piston, as 13. The upward movement, or working stroke of the piston causes a ball valve 43 to be depressed against the tension of its spring 44 and the depression of this ball valve from its seat opens an exhaust port from the motor case below the piston 13 to permit flow of air under pressure from the motor case back to the cylinder 30 through return hose 33. It will be understood that the end of the cylinder, above the piston, is open to atmospheric pressure.

The ball valve is depressed by means of a spring pressed plunger 45, and the latter is depressed by contact from one end of a rocker arm 46 that is pivoted on the top of the motor casing. The other end of this rocker arm is retained by a pivoted spring-returned latch 47, which latch is lifted against tension of spring 50 to release the rocker arm through the instrumentality of a latch pin 48 that is supported in the top of the motor casing and projects into the interior of the casing in the path of movement of the piston 13. This pin is lifted by contact with the rising piston and engages under a flange of the latch 47 to release the latch and free the rocker arm, but before the pin is lifted and the latch released, the rocker arm is placed under tension of a spring 49 that is compressed by the piston 13 before the piston strikes the pin 48. As indicated by dotted lines in Figure 1 the spring 49 projects deeper in the motor casing than the pin 48, and as the spring is compressed, as soon as the pin 48 is lifted to release the latch from the rocker arm, the latter is rocked with a snap, by the compressed spring 49 to remove the ball from its seat.

When the ball valve is removed from its seat a blast of air passes through hose 33 to the right end of the cylinder 30 in Figure 2, which blast impinges against the outer face of the head 39 of the piston-valve to move the latter to the left. This movement of the piston valve shuts off or cuts off the port of hose 32 from the port of hose 31, and opens the port of hose 34 to the port of hose 31 in order that compressed air may flow to the other motor 6, and the same cycle is performed therein. The drain cocks 36 and 37 vent the cylinders at opposite ends to reduce pressure at the ends of the cylinder, alternately, in order that the piston-valve may reciprocate under pressure entering the center of the cylinder through supply pipe 31.

On the down stroke of the plunger 13 the ball valve is closed by its spring, and the valve operating mechanism is restored to its original position by the action of this spring and the return of the spring pressed plunger 45. The upward movement of the spring pressed plunger 45 rocks the arm 46 to the normal position shown in Figure 1. At this time the pin 48 will have been lowered from engagement with the latch 47 and the latch is urged by its spring 50 into locking engagement with the rocker arm 46. Inasmuch as the pin 48 and the spring 49 are both located above the piston, there is no necessity for providing means to prevent leakage of air at these points. The down strokes of the pistons are cushioned by use of the vent cocks 36 and 37, and, although the weight of the swaying car is imposed on the descending piston, the cocks may be adjusted in such manner as to eliminate shocks that might otherwise occur in the operation of the reciprocating motors. Thus the violence of the side-swaying or rocking motion of the car may be varied by proper adjustment of these vent cocks.

By the operation of the machine, the car is rocked while supported upon the frame, and motion is imparted thereto which closely resembles the movement or vibrations of a traveling car as it moves over a rough surface, and it will be apparent that shackle bolts, spring-leaves, and other parts of the car are subjected to the same movements that would be imparted by the traveling car. In this manner "frozen" joints are loosened of coagulated grease or oil to permit introduction of the necessary lubricant thereby facilitating the work of the mechanic, and the squeaks or noises developed will enable the mechanic to detect the places from which these noises or sqeaks originate.

The lift of the motors, it will be understood, is only slight, but the continuation of the movement at alternate sides of the car is sufficient to flex the springs, and during the flexing movement the spray gun is employed to inject the lubricant between the leaves of the springs. The same facility in lubrication is also attained at other greasing points where there are relatively movable parts, and the time required for the greasing operation, as well as the labor required, are thus reduced.

Changes and alterations may be made in the exemplified structure of the drawings, to adapt the machine for different conditions, within the scope of my appended claims, without departing from the principles of my invention, and such changes are contemplated.

Having thus fully described my invention, what I claim as new and desire to secure by Letters Patent is:—

1. In a machine for the purpose described, the combination with a support, of a pair of bars mounted on said support and a motor on each end of the pair each motor comprising a lifting member, means for alternately operating said motors, a rocking beam supported on said members, and adjustable supports mounted on said beam.

2. In a machine as described, the combination with a bar and a motive fluid motor mounted on each of the opposite ends of said bar, of a lifting member operated by each motor, means controlling the motors to alternately lift and lower said members, fulcrum points on said members, a rocking beam mounted on said points and having a socket therein, coacting means comprising a pin on one of the members to engage said socket to prevent displacement of the beam, and a pair of adjustable supports mounted on the beam.

3. In a machine as described, the combination with a frame, of a bar, adjustable fastening means for securing said bar on the frame, a pneumatic motor mounted on each of the opposite ends of the bar, a lifting member operated by each motor, means controlling the motors to alternately lift and lower the members, a rocking beam mounted on said members, coacting means on a member and said beam to prevent displacement of the latter, and a pair of adjustable supports mounted on the beam.

4. In a rocking machine, the combination with a separable rocking beam having a hole therein, and duplex operating means for alternately lifting and lowering opposite ends of said beam, a retaining pin mounted on one of said operating means and located in said hole, a pair of screw jacks mounted on said beam adapted for engagement with the vehicle to form a rigid connection between the vehicle and beam, and coacting means on one of said jacks and the beam for securing the former in adjusted position.

5. In a machine as described, the combination with a frame, of a bar mounted on the frame, a motor at each of the opposite ends of said bar, trunnions on the motors having bearings on said bar, a lifting member operated by each motor, means controlling the motors to alternately lift and lower said members, fulcrum points on the members, a rocking beam mounted on said points, and adjustable supports mounted on said beam.

6. A device for rocking a vehicle, comprising a beam adapted to be disposed beneath the vehicle body, bearing members on the beam forming rigid connections between the latter and the vehicle, said bearing members adapted to engage with portions of the vehicle body to lift the body weight from the vehicle springs, and mechanism for rocking said beam on an axis disposed transversely of the beam to alternately raise and lower said bearing members.

CLAUDE C. CALKINS.